(12) United States Patent
Pöyhönen et al.

(10) Patent No.: US 7,747,731 B2
(45) Date of Patent: Jun. 29, 2010

(54) MINIMIZING MESSAGE PROCESSING LATENCY IN A COMMUNICATION NETWORK

(75) Inventors: Petteri Pöyhönen, Helsinki (FI); Jarno Rajahalme, Kirkkonummi (FI)

(73) Assignee: Nokia Corporation, Espoo (FI)

(*) Notice: Subject to any disclaimer, the term of this patent is extended or adjusted under 35 U.S.C. 154(b) by 1375 days.

(21) Appl. No.: 10/443,147

(22) Filed: May 22, 2003

(65) Prior Publication Data
US 2004/0215795 A1    Oct. 28, 2004

Related U.S. Application Data

(60) Provisional application No. 60/457,584, filed on Mar. 27, 2003.

(51) Int. Cl.
G06F 15/177    (2006.01)
(52) U.S. Cl. ............... 709/224; 709/223; 709/230; 709/232; 714/4
(58) Field of Classification Search ......... 709/230–237, 709/245, 223–224, 217–219; 714/1–100; 710/58
See application file for complete search history.

(56) References Cited

U.S. PATENT DOCUMENTS

| | | | | |
|---|---|---|---|---|
| 5,339,316 | A * | 8/1994 | Diepstraten | 370/401 |
| 5,553,280 | A * | 9/1996 | Fortier | 707/10 |
| 5,574,919 | A | 11/1996 | Netravali et al. | |
| 6,101,168 | A * | 8/2000 | Chen et al. | 370/228 |
| 6,463,259 | B1 * | 10/2002 | Kim | 455/3.01 |
| 6,542,464 | B1 * | 4/2003 | Takeda et al. | 370/230 |
| 6,553,227 | B1 * | 4/2003 | Ho et al. | 455/433 |
| 6,640,325 | B1 * | 10/2003 | Fischer | 714/748 |
| 6,711,128 | B1 * | 3/2004 | Ramakrishnan | 370/230 |
| 6,731,648 | B1 * | 5/2004 | Cotter | 370/458 |
| 6,735,202 | B1 * | 5/2004 | Ahmed et al. | 370/392 |

(Continued)

FOREIGN PATENT DOCUMENTS

EP    1085723    3/2001

(Continued)

OTHER PUBLICATIONS

G. Dommety(editor), A. Yegin, C. Perkins, G. Tsirtsis, K. El-Malki, and M. Khalil-Internet Draft, (draft-ietf-mobileip-fast-mipv6-04.txt) "Fast Handovers for Mobile IPv6", Mar. 2002, pp. 1-62.

(Continued)

*Primary Examiner*—Joseph Thomas
*Assistant Examiner*—Brendan Higa
(74) *Attorney, Agent, or Firm*—Alston & Bird LLP

(57) ABSTRACT

The present invention concerns a method and a system for minimizing message processing latency in a communication network. A message from a first node is received at a second node which message requires an acknowledgement message, preferably of Boolean type. Functionalities required for processing the message are partitioned into at least a first part and a second part. The first part comprises a minimum set of functionalities required to generate the acknowledgement message. The functionalities of the first part are executed. The acknowledgement message is generated and transmitted to the first node after to finishing the functionalities of the first part. The present invention makes it possible to effectively minimize the perceived message processing latency. It is also possible to dynamically optimize the latency according to available resources.

17 Claims, 4 Drawing Sheets

U.S. PATENT DOCUMENTS

| | | | | |
|---|---|---|---|---|
| 7,055,085 B2 * | 5/2006 | McDaniel | .................... | 714/776 |
| 7,072,309 B2 * | 7/2006 | Xie et al. | .................... | 370/278 |
| 7,103,881 B2 * | 9/2006 | Stone | ........................ | 717/148 |
| 7,107,493 B2 | 9/2006 | Nguyen et al. | | |
| 2002/0165993 A1 * | 11/2002 | Kramer | ...................... | 709/315 |
| 2003/0012198 A1 * | 1/2003 | Kaganoi et al. | ............. | 370/392 |
| 2003/0043758 A1 * | 3/2003 | Jou | ............................ | 370/278 |
| 2003/0100962 A1 * | 5/2003 | Sumita et al. | ................. | 700/65 |
| 2003/0117974 A1 * | 6/2003 | Kang | ......................... | 370/328 |
| 2003/0133497 A1 * | 7/2003 | Kinjo et al. | ................. | 375/152 |
| 2003/0200180 A1 * | 10/2003 | Phelan et al. | .................. | 705/65 |
| 2004/0071152 A1 * | 4/2004 | Wolrich et al. | .............. | 370/420 |
| 2004/0177377 A1 * | 9/2004 | Lin et al. | ....................... | 725/81 |
| 2005/0278714 A1 * | 12/2005 | Vahid et al. | .................. | 717/159 |

FOREIGN PATENT DOCUMENTS

JP          10210079 A  *  8/1998

OTHER PUBLICATIONS

EP Search Report for EP 04396009.5 dated Apr. 10, 2006.

* cited by examiner

MINIMIZING MESSAGE PROCESSING LATENCY IN A COMMUNICATION NETWORK

CROSS REFERENCE TO RELATED APPLICATIONS

This application claims priority of U.S. Provisional Patent Application Ser. No. 60/457,584, entitled "Minimizing Message Processing Latency in a Communication Network," filed on Mar. 27, 2003, the contents of which are hereby incorporated by reference.

BACKGROUND OF THE INVENTION

1. Field of the Invention

The present invention relates to telecommunications. In particular, the present invention relates to a novel and improved method and system for minimizing message processing latency in a communication network.

2. Description of the Related Art

Internet Protocol (IP) has been widely used as an OSI (Open Systems Interconnection) network layer protocol in packet switched networks such as Internet for years. The most commonly used version of IP has traditionally been Version 4 (IPv4). A recently developed version, Version 6 (IPv6), is however also beginning to be supported. IPv6 includes the capabilities of IPv4 but provides also additional features. The most obvious improvement in IPv6 over IPv4 is that IP addresses are lengthened from 32 bits to 128 bits, thus providing for significantly larger amount of network addresses. In the following, IP will be used to refer to IPv6 unless otherwise specified.

Mobile IP is an extension to IP aimed to provide mobility support for IP. Using Mobile IP it is possible for a terminal device to move from one link to another without changing its IP address (as seen by the layers above IP) and yet be reachable. Mobile IP is being developed by IETF (Internet Engineering Task Force) and full specifications may be obtained e.g. from www.ietf.org. In the following Mobile IP will be used to refer to Mobile IP support for IPv6 (Mobile IPv6) unless otherwise specified and the term "Mobile IP network" will be used to refer to an IP network that supports Mobile IP.

Terminology related to Mobile IP used in the rest of this document will be described in the following. A node refers to a device that implements IP. A router refers to a node that forwards IP packets not explicitly addressed to itself. A link refers to a communication facility or medium over which nodes can communicate at the OSI link layer. An interface refers to a node's attachment to a link. A subnet prefix refers to a bit string consisting of a number of initial bits of an IP address. A packet refers to an IP packet having one or more headers and payload. A header comprises one or more fields. A flag refers to a field of one bit length. Thus a flag may have one of two values, either 1 or 0. One of these values is predetermined to be such that when a flag has that value, the flag is considered to be set, often this value is 1. A unit of data used to deliver information related to the protocols used is referred to as a message. Depending on its length a Mobile IP message may be transmitted in one IP packet or it may be divided in parts and the parts may be transmitted in separate IP packets.

A Home Address refers to an IP address assigned to a Mobile Node and used as the permanent or semi-permanent address of the Mobile Node. A Home Subnet Prefix refers to the IP subnet prefix corresponding to a Mobile Node's Home Address. A Home Link refers to the link on which a Mobile Node's Home Subnet Prefix is defined. Any link other than a Mobile Node's Home Link is referred to as a Foreign Link. Any IP subnet prefix other than a Mobile Node's Home Subnet Prefix is referred to as a Foreign Subnet Prefix. A Mobile Node refers to a node that can change its point of attachment from one link to another, while still being reachable via its Home Address. Movement refers to a change in a Mobile Node's point of attachment to an IP network such that it is no longer connected to the same link as it was previously. If a Mobile Node is not currently attached to its Home Link, the Mobile Node is said to be "away from home".

A Correspondent Node refers to a peer node with which a Mobile Node is communicating. The Correspondent Node may itself be either mobile or stationary. A Care-of Address refers to an IP address associated with a Mobile Node while visiting a Foreign Link. The subnet prefix of this IP address is thus a Foreign Subnet Prefix. A Mobile Node may have multiple Care-Of Addresses at any given time but only one may be registered at the Home Agent. A Home Agent refers to a router on a Mobile Node's Home Link with which the Mobile Node has registered its current Care-Of Address.

Binding refers to the association of the Home Address of a Mobile Node with a Care-of Address for that Mobile Node. A Binding Update message is used by a Mobile Node to notify Home Agent and possibly also other nodes of a new Care-of Address for itself.

A Binding Acknowledgement message is used to acknowledge receipt of a Binding Update message.

When a node receives a message, it takes a certain amount of time for the node to process the message, i.e. there exists a certain processing latency. Total processing latency comprises handling time of input, data processing time and handling time of output. The handling time of input refers to the time it takes to parse an incoming message, i.e. to perform syntax checks, semantic checks and validity checks. The handling time of output refers to the time it takes to generate a corresponding outgoing acknowledgement message. The data processing time refers to the time it takes to perform the actual data processing the message requires. For example, if the message were a Binding Update message received by a Home Agent, the data processing time would comprise the time it takes to perform Binding Update authentication, Binding Cache look up, Binding Cache update, Binding Acknowledgement generation, Duplicate Address Detection, Neighbor Discovery and Binding Refresh Request generation.

FIG. 1 illustrates a typical prior art method for processing messages in a Mobile IP network. A message is received in phase 11 after which all the functionalities required for processing said message are executed at once, phase 12. Since the execution of some of these functionalities, especially those involving database transactions, takes a significant amount of time, processing latency results. After finishing the execution of the functionalities an acknowledgement message is transmitted, phase 13.

Neither current Mobile IP specifications nor implementations include any mechanism to optimize or minimize the perceived message processing latency. Yet, as Mobile IP networks will become more common, the amount of users will keep growing and load on single network nodes will keep increasing. Therefore message processing latency will need to be minimized to avoid delays perceived by users.

Thus there is an obvious need for an efficient solution providing a mechanism to minimize the perceived message processing latency.

SUMMARY OF THE INVENTION

The present invention concerns a method and a system for minimizing message processing latency in a communication network. According to one aspect of the invention, a method for minimizing message processing latency in a communication network having nodes includes, receiving at a second node a message from a first node, the message soliciting an acknowledgement message, partitioning functionalities used for processing the message into at least a first part and a second part, the first part comprising at least a minimum set of functionalities to generate the acknowledgement message, executing the functionalities of the first part, and generating and transmitting the acknowledgement message to the first node in response to finishing the functionalities of the first part.

In an embodiment of the invention the communication network is a Mobile IP network. The communication network comprises nodes. A message from a first node is received at a second node which message requires an acknowledgement message, preferably of Boolean type. Functionalities required for processing the message are partitioned into at least a first part and a second part. The first part comprises at least a minimum set of functionalities required to generate the acknowledgement message. The functionalities of the first part are executed. The acknowledgement message is generated and transmitted to the first node in response to finishing the functionalities of the first part. If the functionalities of the first part are finished successfully, the acknowledgement message will be positive. Correspondingly, if the functionalities of the first part are finished unsuccessfully, the acknowledgement message will be negative.

In an embodiment of the invention functionalities of the second part are executed. The second part comprises functionalities required for processing the message which were not comprised in the first part. The functionalities comprised in the second part may be further partitioned into sub-parts. Correspondingly the functionalities of these sub-parts may be executed consecutively, in parallel or in a combination thereof.

In an embodiment of the invention an invalidate message is generated and transmitted to the first node to indicate to said first node to ignore the transmitted acknowledgement message if said acknowledgement message was positive and an error occurs while performing the functionalities of the second part.

In an embodiment of the invention an update message is generated and transmitted to the first node to indicate to said first node to update the transmitted acknowledgement message with the update message, if execution result of the second part so requires.

In an embodiment of the invention the functionalities are repartitioned into at least the first and second parts. In a preferred embodiment of the invention the repartitioning is executed if frequency of invalidate message occurrence exceeds a given limit. In another preferred embodiment of the invention the repartitioning is executed according to current load. Further, since increasing load typically results in an increased amount of functionalities in the first part, response time from the point of view of the first node typically also increases. Thus this increase in response time may be used to indicate an increase in load to the first node.

In an embodiment of the invention the message is a Mobile IP Binding Update—message and the acknowledgement message is a Mobile IP Binding Acknowledgement—message.

In an embodiment of the invention the first node is a Mobile IP Mobile Node and the second node is a corresponding Mobile IP Home Agent. In yet another embodiment of the invention the first node is a Mobile IP Mobile Node and the second node is a Mobile IP Correspondent Node.

The present invention makes it possible to effectively minimize the perceived message processing latency. Further, the present invention makes it possible to dynamically optimize the latency according to available resources. Further, the present invention improves scalability of Mobile IP network elements related to message processing, since only database reads of the first part are affected by the increased latencies of larger databases.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENT(S)

Reference will now be made in detail to the embodiments of the present invention, examples of which are illustrated in the accompanying drawings.

Figure 1:
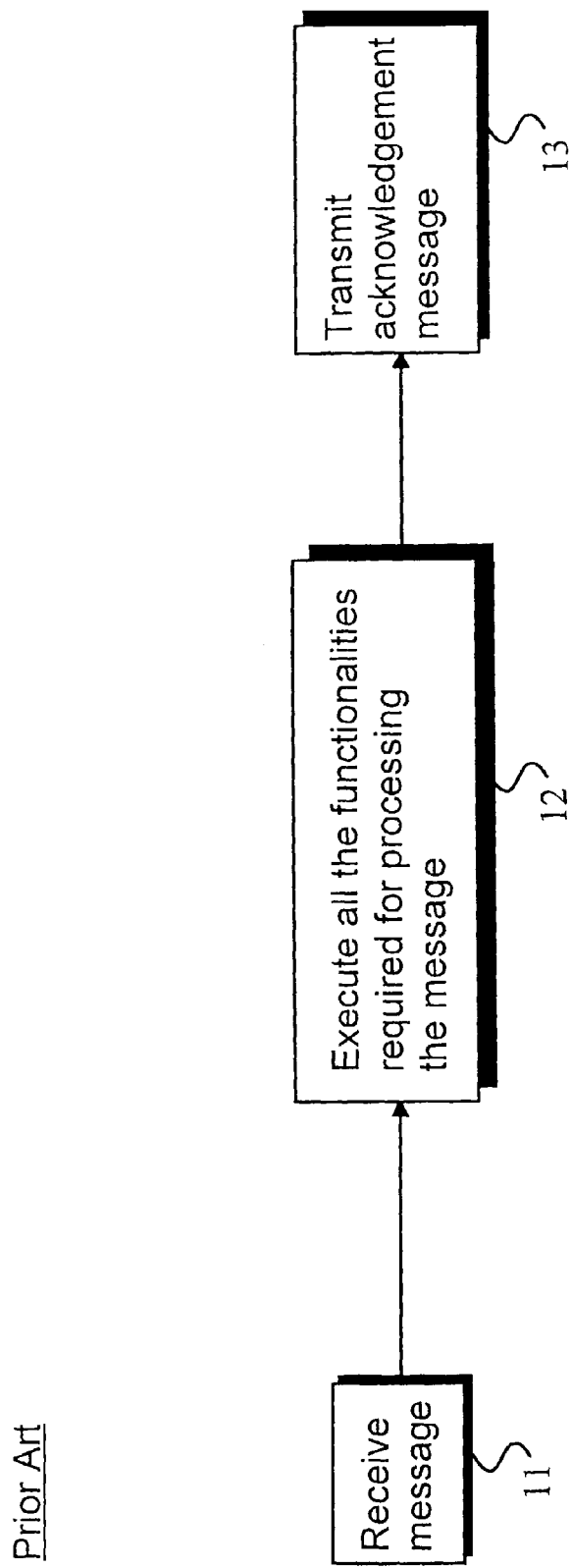
FIG. 1 illustrates a prior art message processing method used in Mobile IP.
Figure 2A:
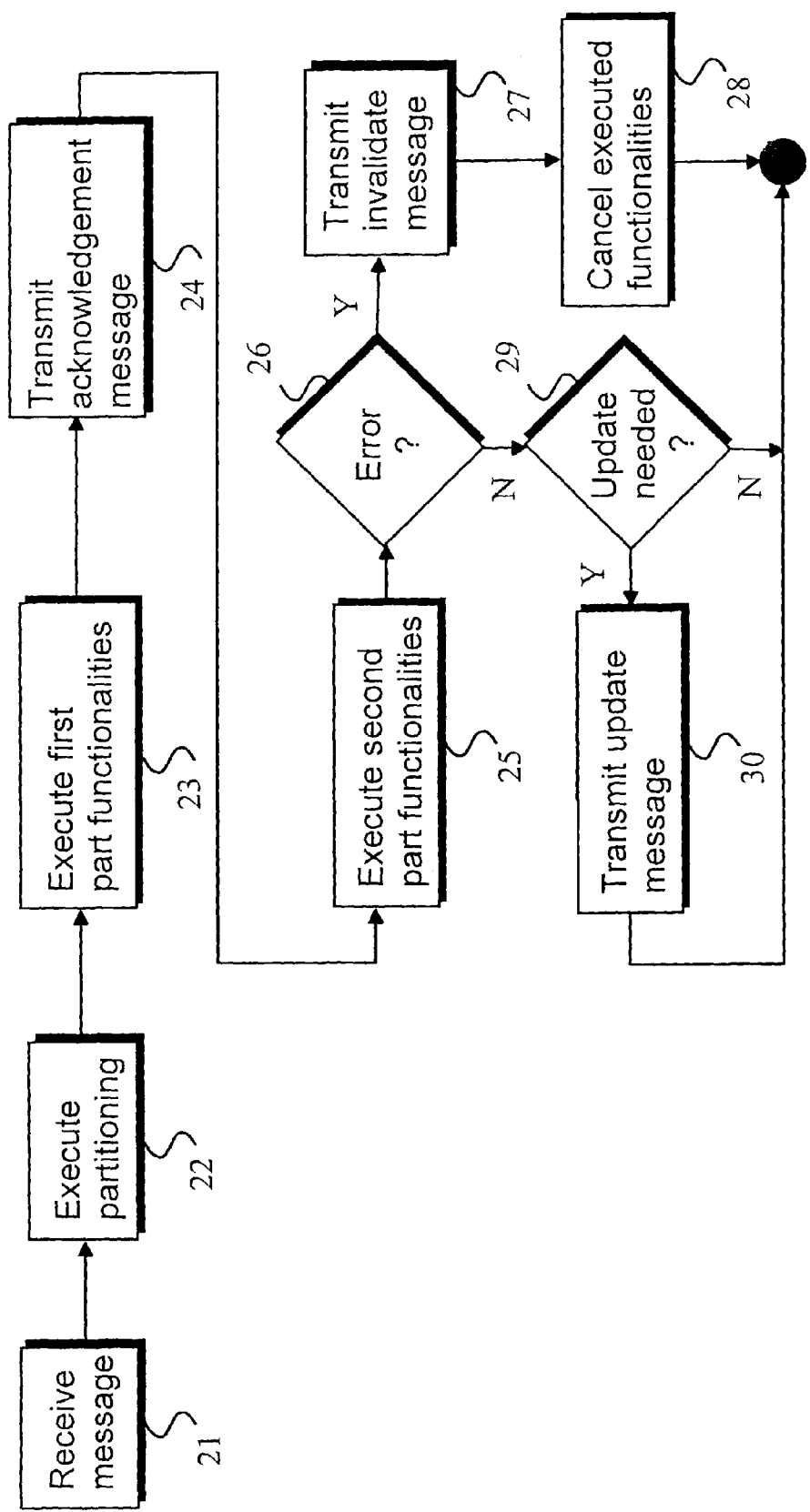
FIG. 2a is a flow chart illustrating a message processing latency minimization method according to one embodiment of the present invention.

FIG. 2a illustrates a method for minimizing message processing latency in a Mobile IP network according to one example of the invention. A message from a first node is received at a second node in phase 21. The message is of a type where an acknowledgement message, preferably of Boolean type, is expected from the second node. Functionalities required for processing the message are partitioned into at least a first part and a second part in phase 22. The first part includes at least a minimum set of functionalities required to generate the acknowledgement message. The functionalities of the first part are executed in phase 23. The acknowledgement message is generated and transmitted to the first node after finishing the functionalities of the first part in phase 24. If the functionalities of the first part are finished successfully, the acknowledgement message will be positive. Correspondingly, if the functionalities of the first part are finished unsuccessfully, the acknowledgement message will be negative.

In phase 25 functionalities of the second part are executed. In this example, the second part includes the functionalities required for processing the message which were not comprised in the first part. If an error occurs while performing the functionalities of the second part and the transmitted acknowledgement message was positive, phase 26, an invalidate message is generated and transmitted to the first node to indicate to said first node to ignore the transmitted acknowledgement message in phase 27. Next, if an error occurred, already successfully executed functionalities are cancelled in phase 28. Preferably the canceling applies both to executed first part functionalities and executed second part functionalities, thus resulting in that the second node will revert back to the state it was in before receiving the message from the first node. If an error did not occur, a need for an update message is checked in phase 29. If there is a need for a update, the update message is generated and transmitted to the first node in phase 30, to indicate to the first node to replace the transmitted acknowledgement message with the update message. Functionalities of the first and second part may be executed at least partly concurrently (not illustrated in FIG. 2*a*), or the execution of the functionalities of the second part may be started after the execution of the functionalities of the first part has been finished, as illustrated in FIG. 2*a*.

The first part can include, in this example, a minimum set of data retrieving and processing functionalities required to generate the positive and negative acknowledgement messages, whereas the second part may include all such time consuming data processing functionalities which have a low probability of failing or causing negative acknowledgement. For example, in so called high availability systems the second part preferably comprises functionalities with the probability of successful processing more than 99%. Thus the probability of successfully processing the functionalities of the second part is very high, and correspondingly the probability of having to transmit the invalidate message is very low. In most cases a failed function of the second part is related to a local resource exhaustion or a system wide stability problem. It is preferable that the acknowledgement message is transmitted as soon as possible after finishing the functionalities of the first part without waiting to finish the typically time-consuming functionalities of the second part.

Figure 2B:
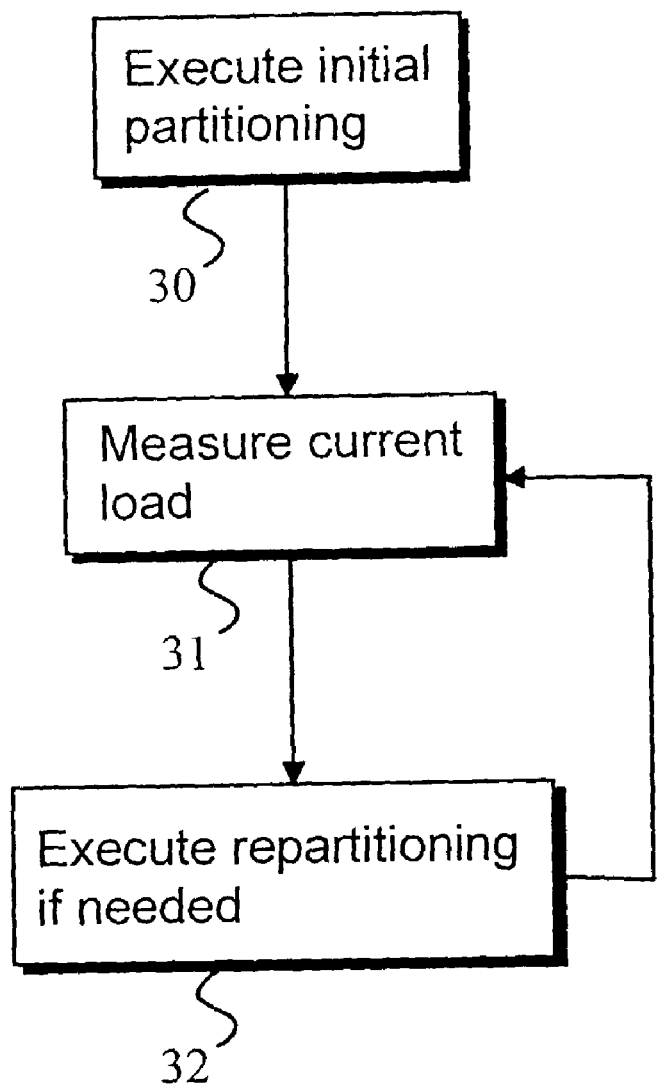
FIG. 2b is a flow chart further illustrating repartitioning message processing functionalities according to one embodiment of the present invention.

FIG. 2*b* illustrates repartitioning message processing functionalities according to one embodiment of the present invention. FIG. 2*b* relates to FIG. 2*a* in that the steps of FIG. 2*b* illustrate implementation of repartitioning process in more detail according to one embodiment of the present invention. The output of this repartitioning process serves as an input for phase 22 in FIG. 2*a*. The output of the repartitioning process is stored e.g. in an internal storage. Phase 22 in FIG. 2*a* then reads this internal storage to get the input. In the embodiment of the invention illustrated in FIG. 2*b* an initial partitioning of the functionalities for processing the message is first executed in phase 30. Next current load is measured in phase 31. If it is determined that load has changed significantly enough, the functionalities required for processing the message are repartitioned accordingly in phase 32. Alternatively the repartitioning may be executed if frequency of invalidate message occurrence exceeds a given limit. However, it should be noted that state information for a message being processed is being stored for each message. Thus, repartitioning only affects messages received after the repartitioning has been executed. In other words, repartitioning has no effect on executing the first and second part functionalities of a message received before the repartitioning was launched even if said first and second part functionalities were not finished before launching the repartitioning.

Figure 3:
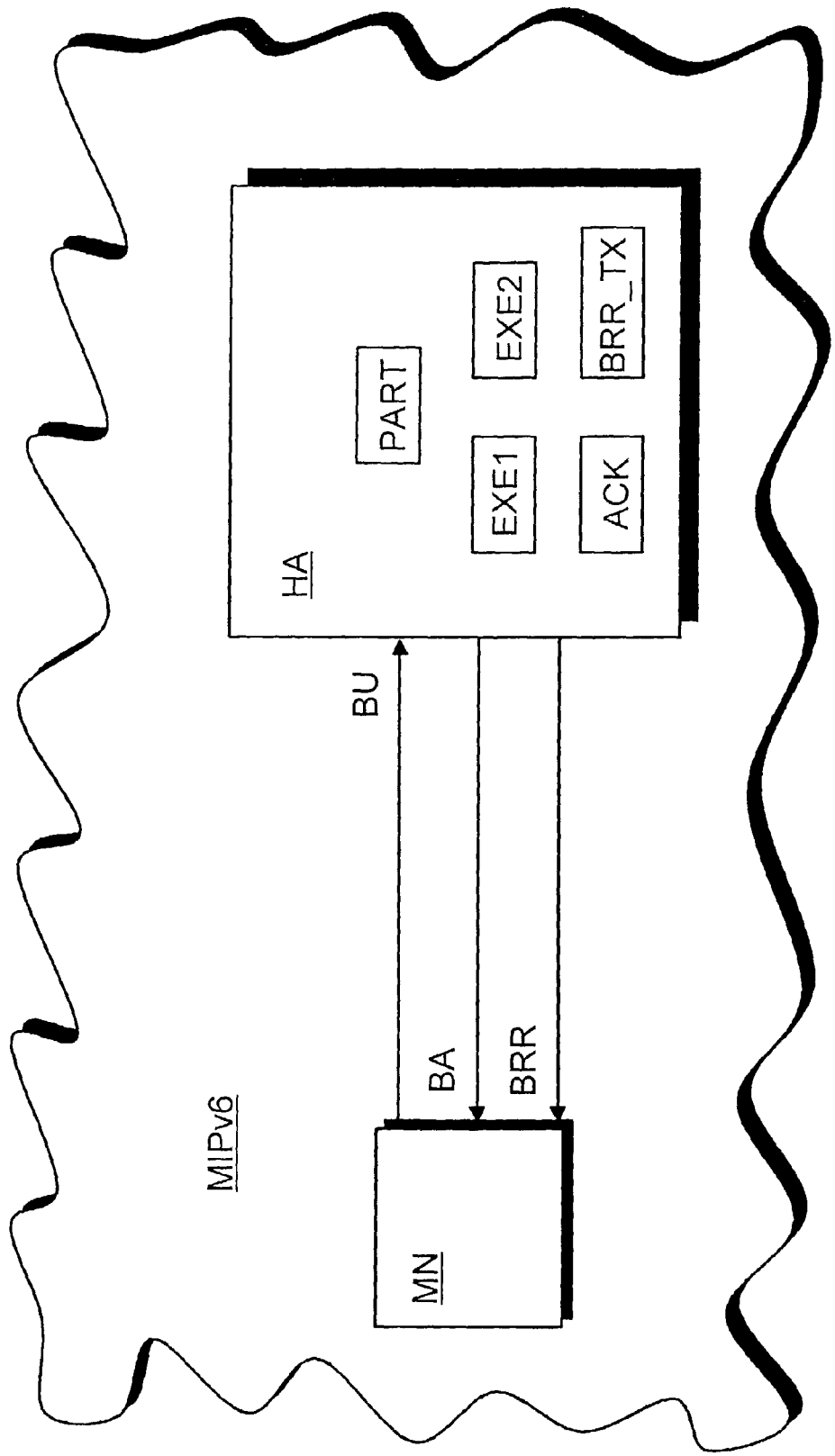
FIG. 3 is a block diagram illustrating a message processing latency minimization system according to one embodiment of the present invention.

FIG. 3 illustrates a system for minimizing message processing latency in a Mobile IP network MIPv6 having nodes. The system includes a first node for transmitting a message and receiving a Boolean type acknowledgement message. The first node is a Mobile Node MN, the message is a Binding Update message BU, and the acknowledgement message is a Binding Acknowledgement message BA in the embodiment of the present invention illustrated in FIG. 3. The system further comprises a second node for receiving the message BU. The second node is a corresponding Home Agent HA in the embodiment of the present invention illustrated in FIG. 3. In another embodiment of the present invention the second node is a Correspondent Node CN (not illustrated in FIG. 3).

The Home Agent HA may include a partitioner PART for partitioning the functionalities used for processing the message BU into at least a first part and a second part. The first part comprises at least a minimum set of functionalities used to generate the acknowledgement message BA. The partitioner is operative to repartition the functionalities of the first and second parts in a preferred embodiment of the present invention. In an embodiment of the present invention the repartitioning will be performed if the frequency of invalidate message occurrence exceeds a given limit. In another embodiment of the present invention the repartitioning will be performed according to current load.

The Home Agent HA in this embodiment further includes a first function executor EXE1 for executing the functionalities of the first part. The Home Agent HA further may include an acknowledgement transmitter ACK for generating and transmitting the acknowledgement message BA to the first node MN in response to finishing the functionalities of the first part. Additionally, the acknowledgement message BA may be transmitted to a second function executor EXE2.

The Home Agent HA further includes a second function executor EXE2 for executing functionalities of the second part, the second part including the functionalities not comprised in the first part. Functionalities of the first and second part may be executed at least partly concurrently, or the execution of the functionalities of the second part may be started after the execution of the functionalities of the first part has been finished. The Home Agent HA further comprises an invalidation transmitter BRR_TX for generating and transmitting an invalidate message BRR to the first node MN to indicate to the first node MN to ignore the transmitted acknowledgement message BA, if the acknowledgement message BA was positive and an error occurs while performing the functionalities of the second part. Mobile IP uses a Binding Refresh Request—message (BRR) to request a Mobile Node's binding from the Mobile Node. This BRR message may additionally be used to carry the information of an invalidate message thus effectively acting as the invalidate message according to the present invention. The Home Agent may also be a distributed network element as is known in the art.

Message processing typically comprises database reads and transactions in a case of the second node being a Home Agent. Database transaction is a well known term referring to a managed operation involving the database. Database transactions involving database updates typically require significantly more time and local resources than database reads alone. Therefore transactions updating the database are preferably executed in the second part whereas database reads are preferably executed in the first part. In an embodiment of the invention the message is a Binding Update message received from a Mobile Node and the second node is a Home Agent, the first part typically comprises Binding Update authentication, Binding Cache look up and Binding Acknowledgement generation. Correspondingly the second part typically comprises Duplicate Address Detection, Binding Cache update and ND proxy. If second part fails a Binding Refresh Request is generated to invalidate the earlier BA.

It is apparent to a person skilled in the art that with the advancement of technology, the basic idea of the invention may be implemented in various ways. The invention and its embodiments are thus not limited to the examples described above, instead they may vary within the scope of the claims.

We claim:

1. A method, comprising:

receiving at a second node a message from a first node, the message including a request for an acknowledgement message to be sent from the second node to the first node;

partitioning message processing functionalities of the second node into at least a first part and a second part, the message processing functionalities being required for processing said received message, said first part comprising at least one of: a minimum set of functionalities required to generate the acknowledgement message, and a message processing functionality having a higher probability of being successfully executed than the functionalities of the second part;

processing the received message at the second node by:

executing the message processing functionalities of the first part;

generating and causing transmission of the requested acknowledgement message to the first node in response to finishing the message processing functionalities of the first part successfully;

executing functionalities of the second part, the second part comprising functionalities not included in the first party; and generating and causing transmission of an invalidate message to the first node to indicate to said first node to ignore the transmitted acknowledgement message, when said acknowledgement message is positive and an error has occurred while performing the functionalities of the second part.

2. The method according to claim 1, wherein the method further comprises:

generating and causing transmission of an update message to the first node to indicate to said first node to replace the transmitted acknowledgement message with the update message, when required by the execution result of the second part.

3. The method according to claim 1, wherein the method further comprises:

repartitioning the functionalities into the first and second parts.

4. The method according to claim 3, wherein the repartitioning is executed when a frequency of invalidate message occurrence exceeds a given limit.

5. The method according to claim 3, wherein the repartitioning is executed repeatedly according to current load.

6. The method according to claim 1, wherein the message is a mobile internet protocol binding update message and the acknowledgement message is a mobile internet protocol binding acknowledgment message.

7. The method according to claim 1, wherein the first node comprises a mobile internet protocol mobile node and the second node comprises a corresponding mobile internet protocol home agent.

8. The method according to claim 1, wherein the first node comprises a mobile internet protocol mobile node and the second node comprises mobile internet protocol correspondent node.

9. A system comprising:

a first node configured to transmit a message, the message requesting an acknowledgement message; and a second node configured to receive the message, and wherein the second node comprises:

a partitioner configured to partition message processing functionalities of the second node into at least a first part and a second part, the message processing functionalities configured to process the received message, the first part comprising at least one of: a minimum set of functionalities required to generate the acknowledgement, and a message processing functionality having a higher probability of being successfully executed than the functionalities of the second part, a first function executor configured to execute the functionalities of the first part, an acknowledgement transmitter configured to generate and cause transmission of the acknowledgement message to the first node after finishing the functionalities of the first part and before executing the functionalities of the second part successfully, a second function executor configured to execute functionalities of the second part in response to the transmission of the acknowledgement message, the second part comprising functionalities not included in the first part, and an invalidation transmitter configured to cause transmission of an invalidate message to the first node to indicate to said first node to ignore the transmitted acknowledgement message, when said acknowledgement message is positive and an error has occurred while performing the functionalities of the second part.

10. The system according to claim 9, wherein the second node further comprises:

an update transmitter operative to generate and cause transmission of an update message to the first node to indicate to said first node to replace the transmitted acknowledgement message with the update message, when execution result of the second part so requires.

11. An apparatus, comprising:

a second node;

a receiver configured to receive a message transmitted from a first node, the message desiring an acknowledgement message from the apparatus;

a partitioner configured to partition message processing functionalities into at least a first part and a second part, the message processing functionalities being required in processing the message, the first part comprising at least one of: a minimum set of functionalities required to generate the acknowledgement message, and a message processing functionality having a higher probability of being successfully executed than the functionalities of the second part;

a first part function executor configured to execute the functionalities of the first part;

an acknowledgement transmitter configured to generate and cause transmission of the acknowledgement message to the first node after completing execution of the functionalities of the first part and before executing the functionalities of the second part successfully; and a second part function executor configured to execute functionalities of the second part in response to the transmission of the acknowledgement message, the second part comprising functionalities not included in the first part;

the acknowledgement transmitter also configured to generate and cause transmission of an invalidate message to the first node to indicate to said first node to ignore the transmitted acknowledgement message, when said acknowledgement message is positive and an error has occurred while performing the functionalities of the second part.

12. The apparatus according to claim 11, wherein the apparatus further comprises:
an update transmitter configured to generate and cause transmission of an update message to the first node to indicate to said first node to replace the transmitted acknowledgement message with the update message, when required by the execution result of the second part.

13. The apparatus according to claim 11, wherein the partitioner is configured to repartition the functionalities into at least the first and second parts.

14. The apparatus according to claim 13, wherein the partitioner is further configured to execute said repartitioning when a frequency of invalidate message occurrence exceeds a given limit.

15. The apparatus according to claim 13, wherein the partitioner is further configured to execute said repartitioning repeatedly according to current load.

16. The apparatus according to claim 11, wherein the message comprises a mobile internet protocol binding update message and the acknowledgement message comprises a mobile internet protocol binding acknowledgment message.

17. The apparatus according to claim 11, wherein the first node is a mobile internet protocol node and the apparatus is a corresponding mobile internet protocol home agent.

* * * * *

UNITED STATES PATENT AND TRADEMARK OFFICE
CERTIFICATE OF CORRECTION

| | | |
|---|---|---|
| PATENT NO. | : 7,747,731 B2 | |
| APPLICATION NO. | : 10/443147 | |
| DATED | : June 29, 2010 | |
| INVENTOR(S) | : Pöyhönen et al. | |

It is certified that error appears in the above-identified patent and that said Letters Patent is hereby corrected as shown below:

<u>Column 7,</u>
Line 25, "party" should read --part--.

<u>Column 8,</u>
Line 41, "functionalities into" should read --functionalities of the apparatus into--.

Signed and Sealed this
Twenty-fifth Day of October, 2011

David J. Kappos
*Director of the United States Patent and Trademark Office*